H. L. TURNEY.
TWO-SPEED LOGGING ENGINE.
APPLICATION FILED NOV. 11, 1918.

1,349,742.

Patented Aug. 17, 1920.
2 SHEETS—SHEET 1.

INVENTOR:
Harry L. Turney
By Mack & Litzenberg
Attorneys.

H. L. TURNEY.
TWO-SPEED LOGGING ENGINE.
APPLICATION FILED NOV. 11, 1918.

1,349,742.

Patented Aug. 17, 1920.
2 SHEETS—SHEET 2.

INVENTOR:
Harry L. Turney,
By
Mack & Litzenberg
Attorneys.

UNITED STATES PATENT OFFICE.

HARRY L. TURNEY, OF PORTLAND, OREGON.

TWO-SPEED LOGGING-ENGINE.

1,349,742.  Specification of Letters Patent.  Patented Aug. 17, 1920.

Application filed November 11, 1918. Serial No. 262,071.

*To all whom it may concern:*

Be it known that I, HARRY L. TURNEY, a citizen of the United States, residing in the city of Portland, county of Multnomah, and State of Oregon, have invented certain new and useful Improvements in Two-Speed Logging-Engines, of which the following is a specification.

My invention relates to logging engines of the character shown and described in Letters Patent No. 1,038,029, issued to me Sept. 10, 1912, and in Letters Patent No. 1,259,173, issued to me March 12, 1918.

The principal object of the present invention is to provide a construction and arrangement in which the main drum and drum-driving gears are mounted on a drum shaft, located preferably between a main driving shaft, driven preferably directly from the engine, and an indirect driving shaft, driven from one of said main drum-driving gears, and having gear connections for driving the other of said drum-driving gears. In other words, I have provided in connection with a main driving shaft and a main drum shaft, an auxiliary driving shaft with gear connections whereby one of said drum-driving gears is driven directly from the main driving shaft, and the other drum-driving gear is driven indirectly from said main driving shaft, through said first drum-driving gear, and said auxiliary driving shaft.

I have illustrated my improved logging engine on the accompanying two sheets of drawings, in which,—

Figure 1:
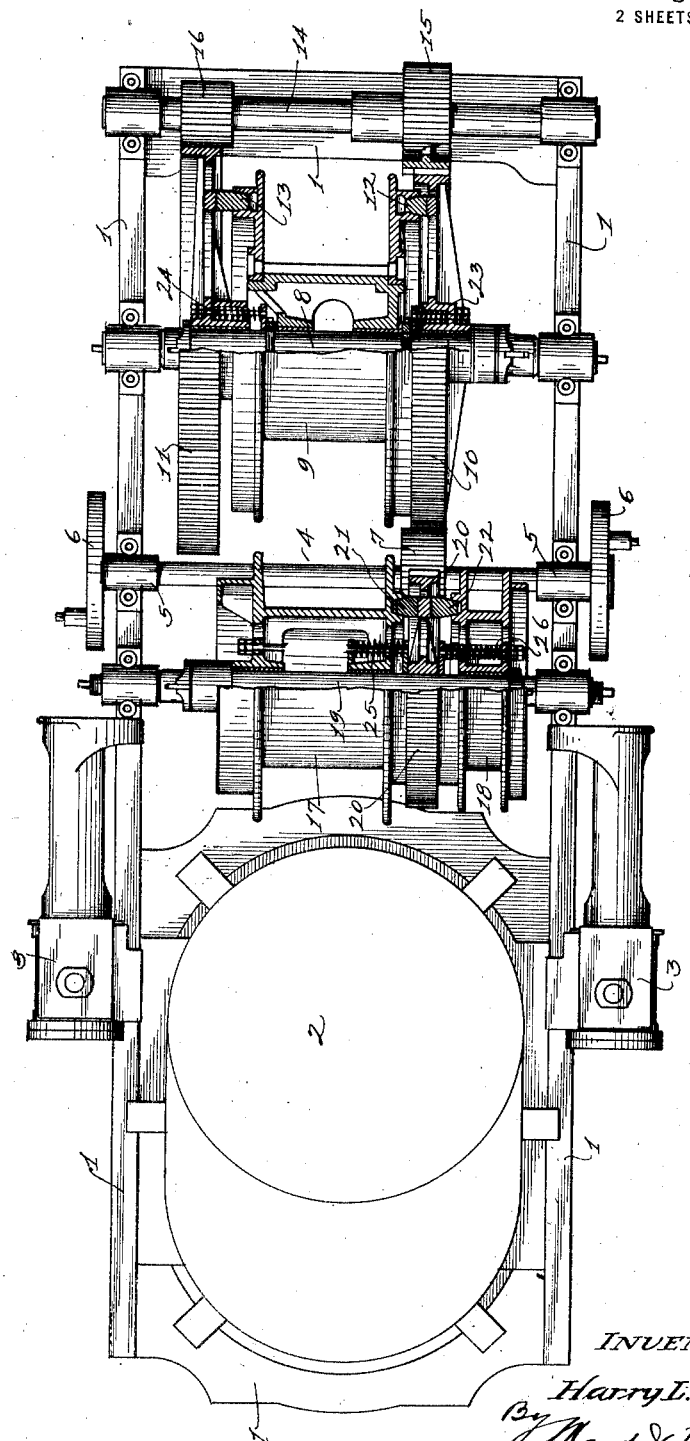
Figure 2:
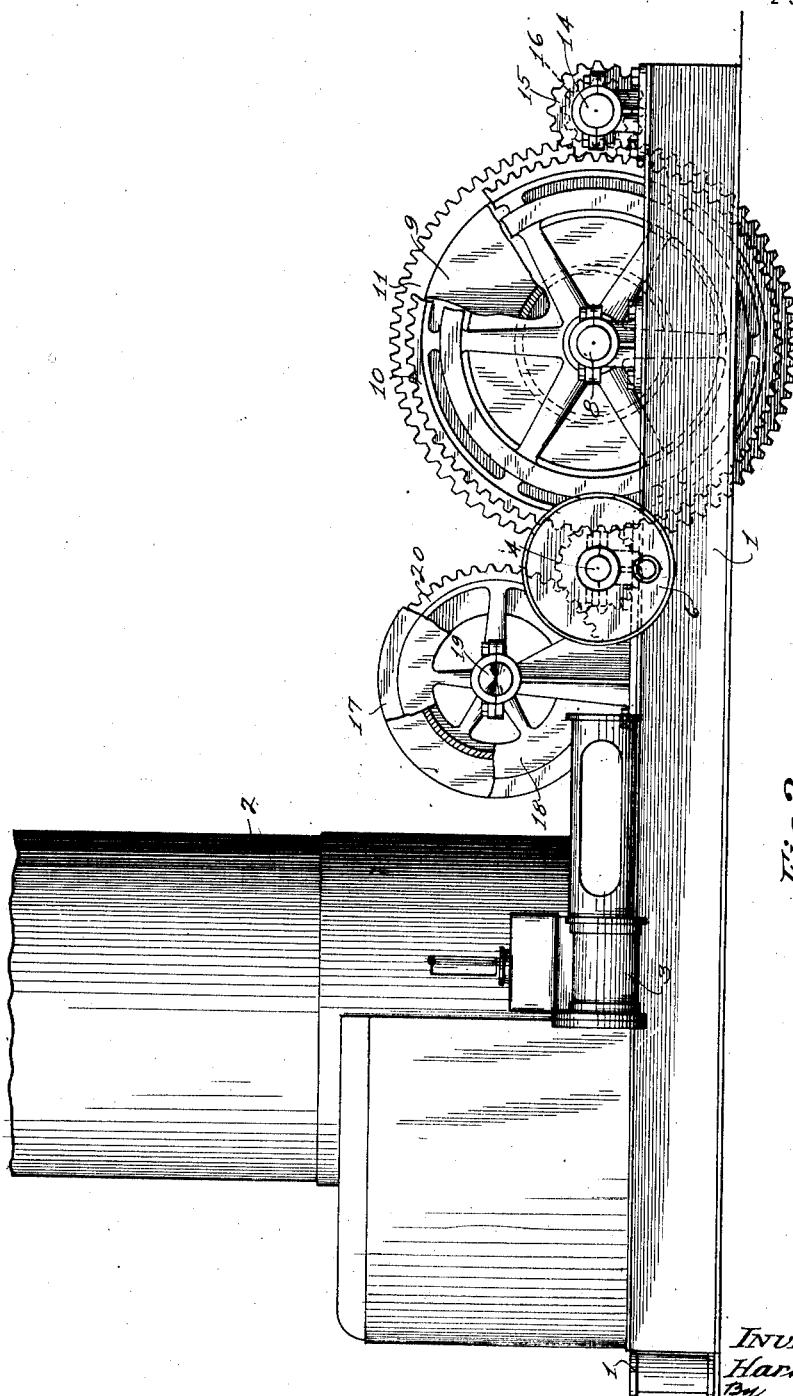

Figure 1 is a top plan view thereof, with parts broken away and shown in section; and Fig. 2 is a side elevation thereof.

Referring now more in detail to the drawings, 1, 1, designate suitable supporting frame members, on which may be mounted a boiler 2, or other power furnishing mechanism, and engines 3, 3. A main driving shaft 4, is mounted in suitable bearings 5, 5, on said frame, and is provided at its opposite ends with crank members 6, 6, adapted to be connected with the engines 3, 3. A gear 7 is mounted on said main drive shaft 4, as shown. Mounted forwardly of said main drive shaft 4, is a main drum shaft 8, on which is mounted a main drum 9. Also mounted on said shaft 8, are drum-driving gears 10 and 11, provided with clutch-connecting means for connecting them with said main drum 9, in a well known manner, said clutch means being designated, respectively, 12 and 13. These will be readily understood for they are substantially the same as shown in my other patents hereinbefore referred to. Drum-driving gear 10 is in mesh with direct drive gear 7, on the main driving shaft 4, and is driven directly therefrom. Also mounted on the frame, forwardly of the main drum shaft 8, is an indirect drive shaft 14, provided with a gear 15, in mesh with drum-driving gear 10. Said shaft 14 is also provided with a gear 16, in mesh with drum-driving gear 11. The gear 10 is less in diameter than the gear 11, and the gear 16 is less in diameter than the gear 15. The purpose of this is evident.

When drum-driving gear 10 is clutch-locked to the drum 9, said drum 9 is driven directly from the main drive shaft 4, through gears 7 and 10. When drum-driving gear 11 is clutch-locked to the drum 9, and gear 10 is disconnected therefrom, said drum is driven from the direct drive shaft 4, indirectly through gears 7, 10, 15, indirect drive shaft 14, and gears 16 and 11. Thus I am able by this arrangement to drive the main drum 9 at different speeds at will, in the same direction, and with different power. Change from one drive to the other can be made easily as conditions require. Where a heavy load is to be lifted or started from a location where greater power and less speed is required, the indirect, or power connection, through gears 7, 10, 15, shaft 14 and gears 16 and 11 can be used. After the load is started and is moving with less resistance, the direct, or speed, connection, through gears 7 and 10 can be thrown into action, thus saving a great deal of valuable time in the course of a day where large logs and the like are being handled for great distances.

As shown in my Letters Patent No. 1,259,173, I have also provided in this engine, two other smaller drums, 17 and 18, mounted on a common shaft 19, as clearly shown. Also mounted on this shaft, 19, between said drums, is a drum-driving gear 20, which meshes with the gear 7, on the main driving shaft 4. Cone clutch mechanisms 21 and 22, are also provided at opposite sides of the gear 20, for driving the drums 17 and 18, at will.

Any suitable drum and gear shifting means can be used for clutch-locking the drums and gears, and I have, therefore, shown no particular mechanism for this purpose, as it is well understood in the art. Furthermore, suitable mechanism for this purpose is described in detail in my patents hereinbefore referred to.

Drum-driving gears 10 and 11 and drum 9 are normally held in disconnected relationship by means of springs 23 and 24, similar to those shown in my patents referred to. Springs 25 and 26 normally hold drums 17 and 18 disconnected from driving gear 20.

I am aware that slight changes can be made in this arrangement without departing from the spirit of my invention, and I do not, therefore, limit the invention to the specific embodiment thereof here shown for illustrative purposes, except as I may be limited by the hereto appended claims.

I claim:

1. In a two speed logging engine, in combination, a support, a direct drive shaft mounted therein, a driving gear thereon, a drum shaft with drum thereon, drum-driving gears on said drum shaft, means for clutch-locking either of said drum-driving gears and said drum together at will, one of said drum-driving gears being in mesh with the driving gear on said direct drive shaft, an indirect drive shaft, and gears on said indirect drive shaft in mesh, respectively, with the drum-driving gears on said drum shaft.

2. In a two speed logging engine, in combination, a direct drive shaft with driving gear thereon, a drum shaft with drum thereon, drum-driving gears on said drum shaft at opposite ends of said drum, means for clutch-locking either of said drum-driving gears to said drum at will, one of said drum-driving gears being in mesh with the driving gear on said direct drive shaft, an indirect drive shaft, and two gears on said indirect drive shaft in mesh, respectively, with said drum-driving gears, whereby one of said drum-driving gears can be driven direct from said drive shaft, and the other drum-driving gear can be driven indirectly through said first drum-driving gear, substantially as described.

3. In a two speed logging engine, in combination, a frame, a direct drive shaft with gear mounted thereon, a drum shaft with drum thereon mounted on said frame in front of said direct drive shaft drum-driving gears on said drum shaft at opposite ends of said drum, means for clutch-locking either of said drum-driving gears to said drum at will, one of said drum-driving gears being in mesh with the driving gear on said direct drive shaft, an indirect drive shaft mounted on said frame in front of said drum shaft, and driving gears on said indirect drive shaft in mesh, respectively, with said drum-driving gears, substantially as described.

4. In a two speed logging engine, in combination, a frame, a direct drive shaft with driving gear thereon, a drum shaft with drum thereon, drum-driving gears on said drum shaft, means for clutch-locking said drum-driving gears to said drum for direct and indirect drive of said drum in the same direction, one of said drum-driving gears being in mesh with the driving gear on said direct drive shaft, an indirect drive shaft mounted on said frame, two indirect driving gears on said indirect drive shaft and meshing, respectively, with said drum-driving gears, said train of gears for the indirect drive being of varying diameters, whereby to give more power and less speed to one of said drum-driving gears when it is driven through the other of said drum-driving gears, substantially as described.

5. In a two speed logging engine, in combination, a frame, a direct drive shaft with driving gear mounted thereon, a drum shaft with drum thereon mounted on said frame in front of said direct drive shaft, drum-driving gears on said drum shaft at opposite ends of said drum, clutch means for driving said drum from either of said drum-driving gears at will, an indirect drive shaft in front of said drum shaft, indirect driving gears thereon and in mesh, respectively, with said drum-driving gears, a second drum shaft provided with a gear in mesh with said driving gear on said direct drive shaft, a second drum on said second drum shaft, and clutch means for interlocking said second drum and the gear on its shaft, substantially as described.

6. In an engine, in combination with the power furnishing mechanism, a direct drive shaft provided with a direct drive gear, a drum shaft provided with a drum, drum-driving gears mounted on said drum shaft at opposite ends of said drum, clutch means for locking said drum and drum-driving gears together at will for driving said drum in the same direction at different speeds, an indirect drive shaft, gears thereon and in mesh, respectively, with said drum-driving gears, said drum-driving gears being of different diameters, and the gears on said indirect drive shaft being of different diameters, substantially as shown and described.

Signed at Portland, Multnomah county, Oregon, this 31st day of October, 1918.

HARRY L. TURNEY.

In presence of—
F. G. LAMY,
R. ALLISON HESS.